United States Patent
McCann

(10) Patent No.: US 9,588,644 B2
(45) Date of Patent: *Mar. 7, 2017

(54) TIME-BASED ORGANIZATION OF DESKTOP ITEMS

(75) Inventor: William Jon McCann, Baltimore, MD (US)

(73) Assignee: Red Hat, Inc., Raleigh, NC (US)

(*) Notice: Subject to any disclaimer, the term of this patent is extended or adjusted under 35 U.S.C. 154(b) by 358 days.

This patent is subject to a terminal disclaimer.

(21) Appl. No.: 13/050,844

(22) Filed: Mar. 17, 2011

(65) Prior Publication Data

US 2012/0240073 A1    Sep. 20, 2012

(51) Int. Cl.

| G06F 3/048 | (2013.01) |
|---|---|
| G06F 3/0482 | (2013.01) |
| G06F 9/44 | (2006.01) |
| G06F 17/30 | (2006.01) |

(52) U.S. Cl.
CPC .......... G06F 3/0482 (2013.01); G06F 9/4443 (2013.01); G06F 17/30997 (2013.01)

(58) Field of Classification Search
CPC .... G06F 3/0481; G06F 3/0482; G06F 9/4443; G06F 17/30997
USPC ........................................................ 715/775
See application file for complete search history.

(56) References Cited

U.S. PATENT DOCUMENTS

| 5,564,004 A | * | 10/1996 | Grossman et al. ........... 715/835 |
|---|---|---|---|
| 5,706,510 A | | 1/1998 | Burgoon |
| 5,838,317 A | * | 11/1998 | Bolnick et al. ............... 715/764 |
| 6,157,935 A | | 12/2000 | Tran et al. |
| 6,725,427 B2 | | 4/2004 | Freeman et al. |
| 7,003,737 B2 | | 2/2006 | Chiu et al. |
| 7,334,186 B2 | | 2/2008 | Wu |
| 7,788,592 B2 | | 8/2010 | Williams et al. |
| 9,286,299 B2 | | 3/2016 | McCann |
| 2005/0188317 A1 | * | 8/2005 | Matthews et al. ............ 715/744 |
| 2006/0155757 A1 | | 7/2006 | Williams et al. |
| 2007/0112732 A1 | | 5/2007 | Clark et al. |
| 2008/0307019 A1 | | 12/2008 | Weiss et al. |
| 2008/0307175 A1 | | 12/2008 | Hart et al. |
| 2008/0307347 A1 | | 12/2008 | Cisler et al. |
| 2010/0049806 A1 | | 2/2010 | Haynes et al. |
| 2011/0269424 A1 | | 11/2011 | Multer et al. |
| 2012/0239623 A1 | | 9/2012 | McCann |
| 2012/0240068 A1 | | 9/2012 | McCann |

OTHER PUBLICATIONS

"Finding and Reminding", http://live.gnome.org/GnomeShell/Design/Whiteboards/FingingAndReminding, (Jul. 21, 2010), 9 pages.
"The Grip, the Trip, and the Slip", http://blogs.gnome.org/mccann/2010/04/07/the-grip-the-trip-and-the-slip/, (Apr. 7, 2010), 10 pages.
"Welcome to Tracker wiki", http://live.gnome.org/Tracker, (Sep. 2, 2010), 2 pages.
"What is Tracker?", http://live.gnome.org/Tracker/WhatIsTracker, (Jul. 8, 2010), 6 pages.

(Continued)

Primary Examiner — Andrey Belousov
(74) Attorney, Agent, or Firm — Lowenstein Sandler LLP

(57) ABSTRACT

A method and system for time-based organization of desktop items is described.

26 Claims, 9 Drawing Sheets

(56) References Cited

OTHER PUBLICATIONS

Rekimoto, Jun , "Time-Machine Computing: A Time-centric Approach for the Information Environment", *Sony Computer Science Laboratories, Inc.*, Shinagawa-ku, Tokyo, Japan, (Nov. 7-10, 1999), 9 pages.

Shuttleworth, Mark , "Here be Dragons", http://www.markshuttleworth.com/archives/383, (2006), 28 pages.

USPTO, Office Action for U.S. Appl. No. 13/050,857 mailed May 7, 2012.

USPTO, Final Office Action for U.S. Appl. No. 13/050,857 mailed Oct. 11, 2012.

USPTO, Advisory Action for U.S. Appl. No. 13/050,857 mailed Dec. 14, 2012.

USPTO, Office Action for U.S. Appl. No. 13/050,865 mailed Mar. 5, 2013.

USPTO, Final Office Action for U.S. Appl. No. 13/050,865 mailed Sep. 19, 2013.

USPTO, Advisory Action for U.S. Appl. No. 13/050,865 mailed Dec. 18, 2013.

USPTO, Office Action for U.S. Appl. No. 13/050,857 mailed Aug. 6, 2014.

USPTO, Final Office Action for U.S. Appl. No. 13/050,857 mailed Jan. 28, 2015.

USPTO, Office Action for U.S. Appl. No. 13/050,865 mailed May 20, 2014.

USPTO, Office Action for U.S. Appl. No. 13/050,865 mailed Dec. 4, 2014.

USPTO, Advisory Action for U.S. Appl. No. 13/050,865 mailed Feb. 24, 2015.

USPTO, Non Final Office Action for U.S. Appl. No. 13/050,857 mailed May 29, 2015.

USPTO, Advisory Action for U.S. Appl. No. 13/050,857 mailed Apr. 1, 2015.

USPTO, U.S. Appl. No. 13/050,857, Notice of Allowance mailed on Nov. 5, 2015, 15 pages.

USPTO, U.S. Appl. No. 13/050,865, Non-Final Office Action mailed on Sep. 22, 2015, 11 pages.

USPTO, U.S. Appl. No. 13/050,865, Final Office Action mailed on Jan. 21, 2016, 12 pages.

USPTO, U.S. Appl. No. 13/050,865, Advisory Action mailed on Mar. 28, 2016, 3 pages.

\* cited by examiner

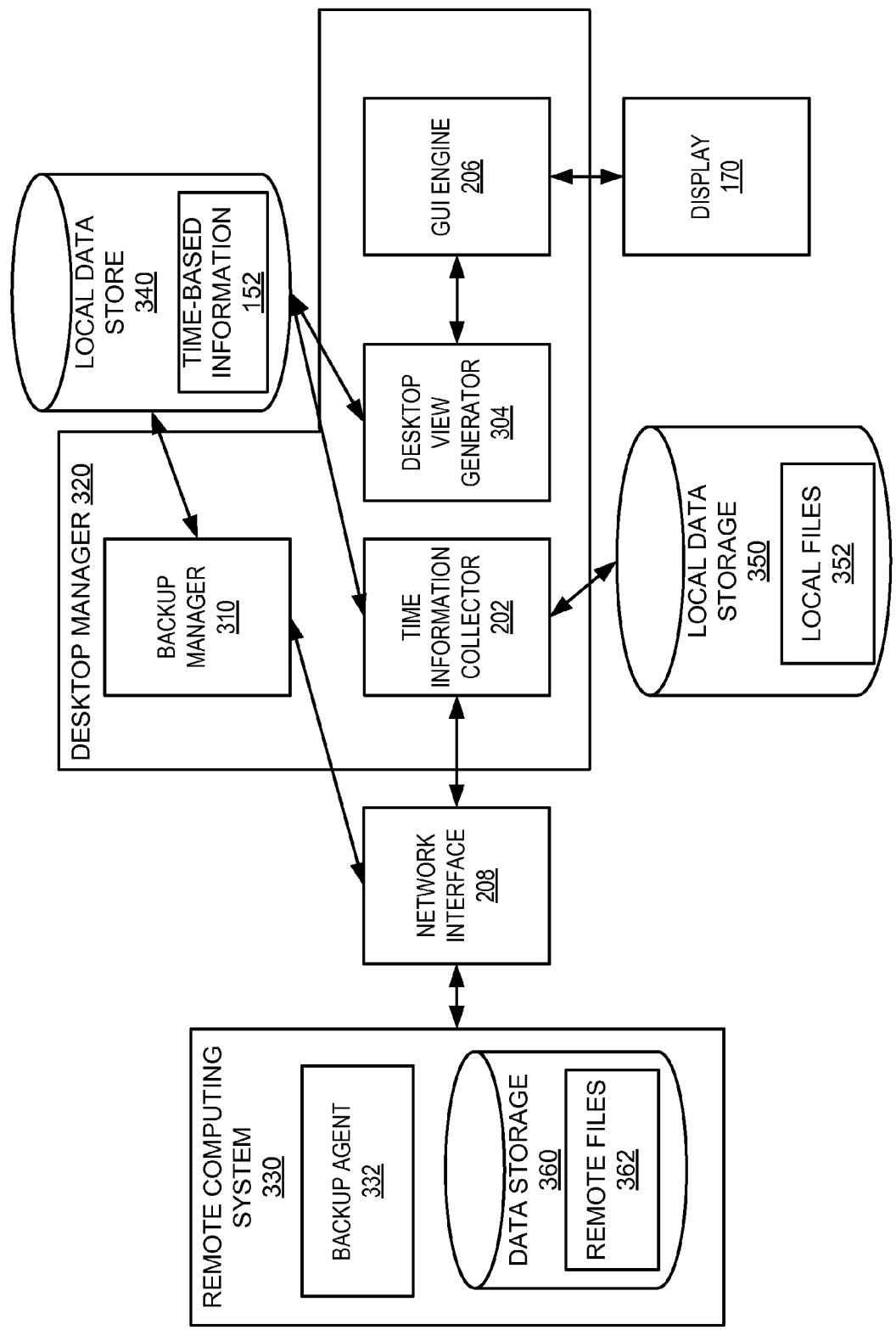

TIME-BASED ORGANIZATION OF DESKTOP ITEMS

RELATED APPLICATIONS

This application is related to co-pending U.S. application Ser. No. 13/050,857, filed Mar. 17, 2011, entitled "Backup of Data Items," and U.S. application Ser. No. 13/050,865 filed Mar. 17, 2011, entitled "Assigning Labels to Desktop Items," filed herewith, whose entire contents are hereby incorporated by reference.

TECHNICAL FIELD

Embodiments of the present invention relate to management of desktop items, and more specifically, to time-based organization of desktop items.

BACKGROUND

It is important for a computing environment to provide a simple and effective way to find, organize, and be reminded about content and data. This is, of course, a complicated and difficult problem; one the industry has been struggling with for almost 40 years. By finding, we are actually referring to re-finding something that has already been seen—intentional/conscious retrieval. This a bit different from the task of web searching for something new. Reminding refers to the establishment and use of cues (usually visual) that assist or supplement memory—opportunistic retrieval. Some have referred to the problem as that of "keeping found things found."

Some functional evaluation frameworks classify three types or sets of information: 1) ephemeral—has a short shelf life and includes items such as unread electronic mail messages (emails), "to do" lists, note pads, memos, calendars, items to print out, forms to fill out, bills to pay, and news articles downloaded from databases; 2) working—is frequently-used information that is relevant to the user's current work needs and that has a shelf life that depends on the lifetime of the project, such as a day or two, a week, or months; and 3) archived—strictly speaking has no shelf life, but is only indirectly relevant to the user's current work, and is infrequently accessed. These items do not go away or become worthless, but they fade from relevance gradually. These functional evaluation frameworks have also identified a number of factors that may be used to evaluate information retrieval systems: 1) portability of information, 2) number of access points, 3) persistence of information, 4) preservation of information in its current state, 5) currency of information, 6) context, 7) reminding, 8) ease of integration, 9) communication and information sharing, and 10) ease of maintenance.

Most computing environments offer a number of tools that attempt to address aspects of the general problem. These often include: desktop (folder), places (folders or collections), search functions, recently used lists, a file manager (e.g., Explorer or Finder), file open/save dialogs (also referred to as file chooser dialogs). Other studies have shown that email, although originally designed as a communications application, has increasingly been used for task management and personal archiving. Some email applications define a few types of information that are kept around and not dealt with immediately, including to-do items, to-read items, items of indeterminate status, ongoing items over a period, and record or history. These may be viewed as another formulation of the three types or sets of information described above.

Conventional computing environments typically store files in file directories of a file system. These conventional computing environments provide a file manager, such as Explorer or Finder, to allow a user to access, view, open, save, create, or modify files in the file system. These conventional computing environments typically provide a desktop view, which is a visual representation of files that are stored in a desktop folder in the file directory. These desktops may be helpful for permanently or temporarily storing files of interest. In general, there are three types of users in these computing environments: 1) "no filers"—never file or categorize information into folders; 2) "spring cleaners"—attempt to file information (often ineffectively) after the organization system has broken down; and 3) "frequent filers"—make strenuous efforts to organize information. Organization information in these computing environments, however, has a number of problems with filing in general. In particular, it is a cognitively difficult task, there are desires to postpone filing judgments, folders may be too small, folders may be too big, folders may be too numerous, and may drastically reduce the reminding function.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 3 is a block diagram of the desktop manager, including a backup manager, according to another embodiment.

DETAILED DESCRIPTION

Figure 1:
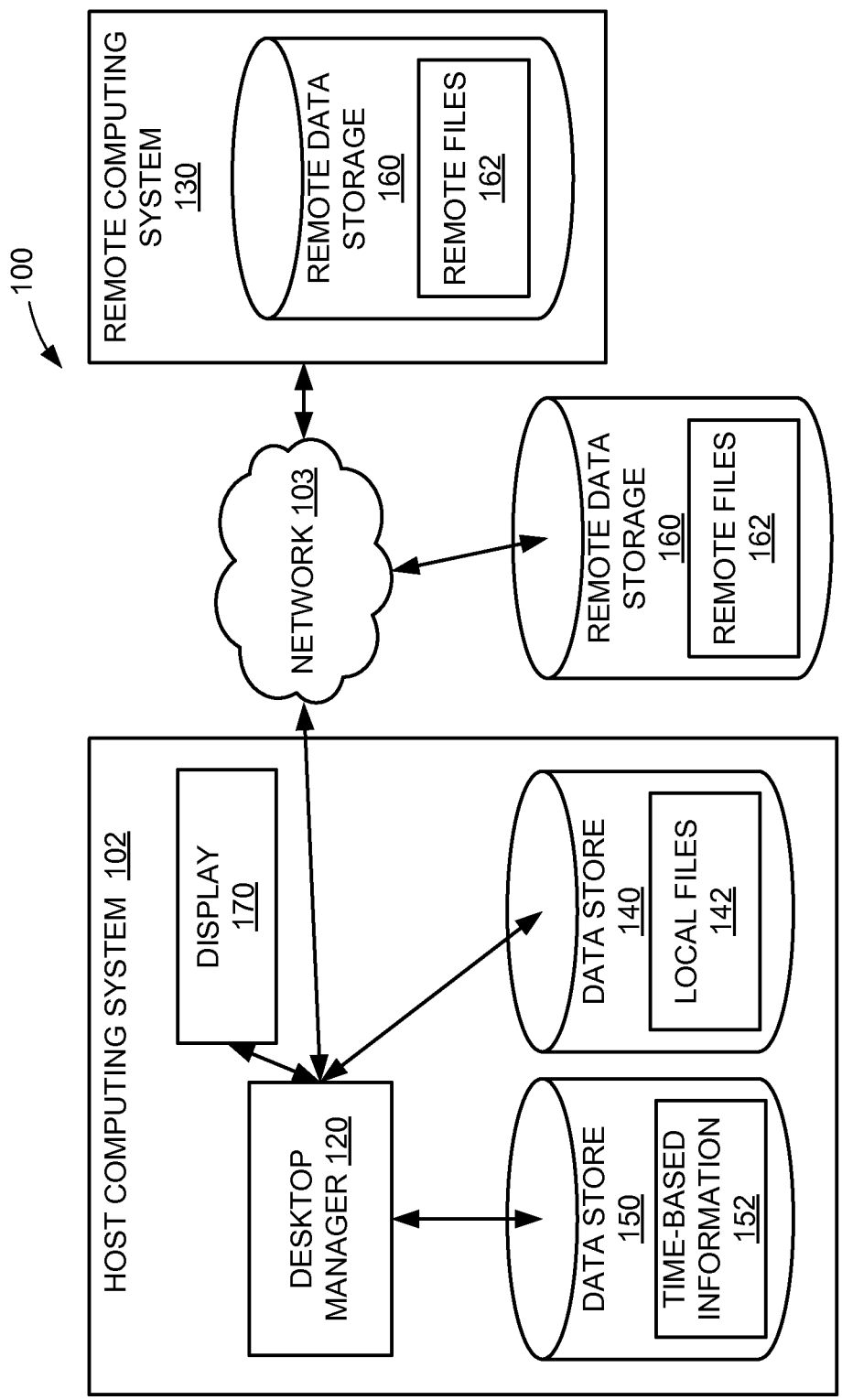
FIG. 1 is a block diagram of an exemplary network architecture in which embodiments of a desktop manager may operate.

A method and system for desktop information management. In one embodiment, a desktop manager collects time-based information about data objects, creates a time-ordered desktop view of desktop items from the data objects using the time-based information. The data objects may be any data that is encapsulated, such as a value, a variable, a function, a program, or a data structure that can be processed by a computing system, such as file system objects, objects of databases, files, applications, scripts, instant message conversations, blog entries, social media posts, and other data as would be appreciated by those of ordinary skill in the art having the benefit of this disclosure. The data object may be the file itself or may be data objects stored within a file. In one embodiment, the time-based information about each of the data objects includes at least one of a creation timestamp, a last-accessed timestamp, a last-modified timestamp, a calendar event, a reminder event, or a follow-up date. Alternatively, the time-based information may be other information about the data objects, such as a reminder data, due date data, to-do data, to-read data, reoccurring event data, or record or history data associated with the respective data objects. In another embodiment, the time-based information about each of the data objects includes a time-based type of action to be performed on the respective data object, the time-based type of actions including a future action, a current action, and a past action. The time-based information may be used to organize the desktop items according to the time-based type of actions. The desktop manager presents a graphical user interface (GUI) on a display, the GUI displaying at least a portion of the time-ordered desktop view of the desktop items. The GUI may present the time-ordered view in at least one of a list view, a thumbnail view, an icon view, or a menu view. For example, the time-ordered view may be a time-ordered list of desktop items. The GUI may be presented in at least one of a file browser (e.g., MS Explorer, Mac OS Finder, or other file chooser applications), a web browser, a viewing area of an application, or a working area (main view) of the computing system's display. The GUI may be displayed within a window, which is a visual area of the display containing some kind of user interface. The GUI displays the output of one or more processes and allows input to be received from the user for those processes. The GUI can be manipulated by the user using a mouse cursor, and can receive input view a keyboard, a mouse, a touchpad, or other user input devices. The GUI may include other graphical objects, such as a menubar, toolbars, controls, icons, or the like. It should also be noted that the GUI may be represented in one or more windows. Alternatively, the desktop view may be presented as a main view of the computer's display, such as the background of the display that can be covered at times by windows that have been opened. Also, as described herein, the GUI may provide an activities view as the background and the desktop view can be a window that opens on top of the activities view.

In another embodiment, the desktop manager collects time-based information about data objects stored in a local data storage, creates a desktop view of desktop items, and determines whether to back up one or more of the desktop items using the time-based information. The desktop manager, based on the determination, automatically backs up the one or more desktop items in a remote data store over a network.

In another embodiment, the desktop manager collects time-based information, creates a time-ordered desktop view of desktop items using the time-based information, and filters the time-ordered desktop view according to labels. The desktop manager presents a GUI on a display with at least a portion of the filtered, time-ordered desktop view of desktop items.

As described above, it is important for a computing environment to provide a simple and effective way to find, organize, and be reminded about content and data. The embodiments described herein provide an improved computing environment that provides a simple and effective way to find, organize, and be reminded about content and data via a desktop view. The embodiments described herein may use three categories of information: 1) on hand—information that should remain easily and quickly accessible while relevant; 2) under foot—information that should be visible to facilitate opportunistic finding and reminding; and 3) out of sight—when the shelf life of the first two types of information expire, they should slip out of view. Information that is frequently used or currently relevant should be kept around and readily available. Information that is incomplete or needs attention or action should be kept in a place where it may be tripped over to offer opportunistic finding and reminding. Other information that may no longer be immediately relevant should be available, but out of the way and not interfere, clutter, or confuse. Out-of-the-way information should have a distance that is proportional to its relevance (such as a time of last use). The embodiments described herein organize information so that the information is available, persistent, current, contextual, present (serves as a useful reminding function), shareable, and transparent (doesn't require effort to maintain). The embodiments described herein may be beneficial to the three types of users as described above—the "no filers," "spring cleaners," and "frequent filers."

In the following description, numerous details are set forth. It will be apparent, however, to one of ordinary skill in the art having the benefit of this disclosure, that embodiments of the present invention may be practiced without these specific details. In some instances, well-known structures and devices are shown in block diagram form, rather than in detail, in order to avoid obscuring the embodiments of the present invention.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "collecting," "creating," "filtering," "presenting," "receiving," "generating," "quantifying," "reporting," "executing," "defining," "specifying," "initializing," "processing," "providing," "computing," "calculating," "determining," "displaying," or the like, refer to the actions and processes of a computing system, or similar electronic computing systems, that manipulates and transforms data represented as physical (e.g., electronic) quantities within the computing system's registers and memories into other data similarly represented as physical quantities within the computing system memories or registers or other such information storage, transmission or display devices.

Embodiments of the present invention also relate to an apparatus for performing the operations herein. This apparatus may be specially constructed for the required purposes, or it may comprise a general-purpose computing system specifically programmed by a computer program stored in the computing system. Such a computer program may be stored in a computer-readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions.

FIG. 1 is a block diagram of exemplary network architecture 100 in which embodiments of a desktop manager 120 may operate. The network architecture 100 may include a host computing system 102, which hosts the desktop manager 120, and one or more remote devices, including, for example, a remote computing system 130, and a remote data storage 160, which are each connected to the host computing system 102 via one or more networks 103. The one or more networks 103 may each be a private network (e.g., a local area network (LAN), wide area network (WAN), intranet, etc.) or a public network (e.g., the Internet). The host computing system 102 may be one or more machines including one or more computers, desktop computers, laptop computers, gateways, cellular phones, personal digital assistants (PDAs), other portable or non-portable computing devices. In one embodiment, the host computing system is a client-computing device. In another embodiment, the host computing system 102 is a server of an enterprise, but is a "client" with respect to the other network devices. The remote computing system 130 may be one or more machines including one or more server computers, gateways, routers, switches, or other network computing devices. In one embodiment, the host computing system 102 has data stores 140 and 150, which are configured to store local data objects 142 and time-based information 152, respectively. The data stores 140 and 150 may be separate databases, and may reside on one or more of the same or different storage devices (e.g., the computer-readable medium described above) that are local to the host computing system 102 and/or remote from the host computing system 102. In one embodiment, the data stores 140 and 150 are stored in the same storage device of the host computing system 102. In one embodiment, the local data objects 142 are stored in a file directory according to a file system used by an operating system of the host computing system 102, and the time-based information 152 is stored in an index that allows for quick searching and retrieval of the time-based information 152 about the local data objects 142. In another embodiment, the local data objects 142 and the time-based information 152 are stored in a single database. In another embodiment, the local data objects 142 are not stored according to the file system of the host computing system 102, but are stored using other storage schemes as would be appreciated by one of ordinary skill in the art having the benefit of this disclosure.

In one embodiment, the remote computing system 130 includes data storage 160, which may be configured to store remote data objects 162 for the host computing system 102. The remote data objects 162 can be stored in a database or other type of data store, and may be stored according to a file system of the remote computing system 130. The data storage 160 may be one or more storage devices that are local or remote to the remote computing system 130. In yet another embodiment, the network architecture 100 includes a remote data storage 160, which is configured to store remote data objects 162 for the host computing system 102. The remote data storage 160 may be one or more storage devices. The remote data objects 162 can be stored in a database or other type of data store, and may be stored according to a file system or according to blocks or other logical units of data as would be appreciated by one of ordinary skill in the art having the benefit of this disclosure.

The host computing system 102 interacts with the remote computing system 130 and/or remote data storage 160 by exchanging messages via one or more communication protocols.

The host computing system 102 includes a processing device 104 that executes the desktop manager 120. The processing device 104 represents one or more general-purpose processing devices such as a microprocessor, central processing unit, or the like. More particularly, the processing device 104 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 104 may also be one or more special-purpose processing devices such as an application specific integrated circuit (ASIC), a field programmable gate array (FPGA), a digital signal processor (DSP), network processor, or the like. The processing device 104 is configured to execute the processing logic (e.g., desktop manager 120) for performing the operations and steps discussed herein. The operations of the desktop manager 120 are described in more detail below with respect to FIGS. 2, 3, 4A-4D. The desktop manager 120 may be a stand-alone application that executes on the host computing system 102 or may be integrated into the operating system of the host computing system 102. By integrating the desktop manager 120 into the operating system, the desktop manager 120 can more easily monitor operations being performed on the local data objects 142 and remote data objects 162 by the operating system and other applications executing on the host computing system 102.

In the depicted embodiment, the host computing system 102 includes a display 170 on which the desktop manager 120 can present GUIs. The GUIs allow a user to interact with the desktop manager 120, such as to view the desktop items, create and add labels to desktop items, to specify parameters for automatic back up of the desktop items or the like, as described in more detail below.

Figure 2:
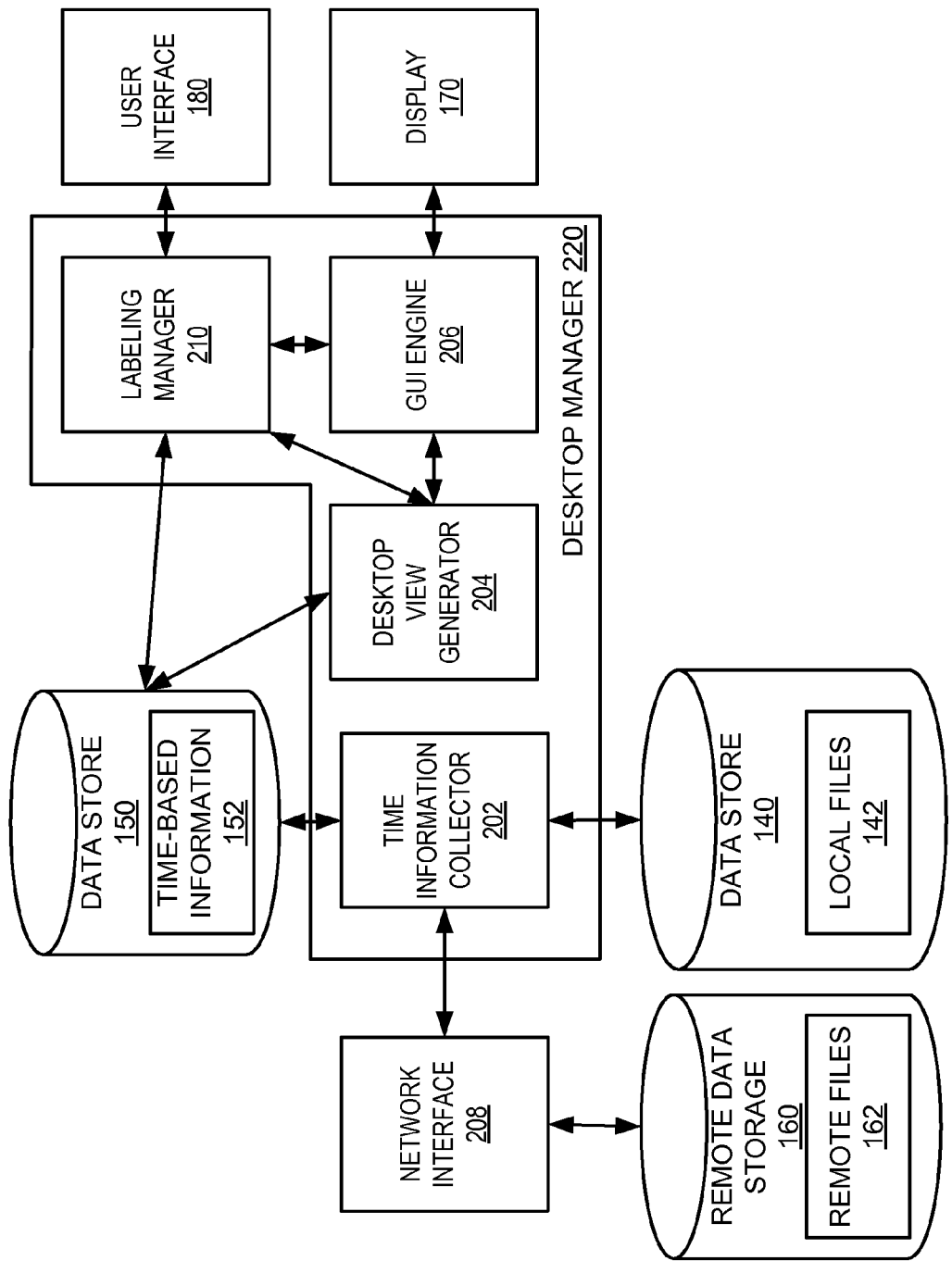
FIG. 2 is a block diagram of the desktop manager according to one embodiment.

FIG. 2 is a block diagram of the desktop manager 220 according to one embodiment. The desktop manager 220, which is executed by the processing device 104, performs various desktop information management functions as described in various embodiments below. The desktop manager 220 may be integrated into the operating system of the host computing system 102. The desktop manager 220 may also be a stand-alone application. However, when integrated as part of the operating system, the desktop manager 220 can be one or more processes that are always running when the operating system is running. The desktop manager 220 can monitor activities being performed on data objects in order to maintain and present current information and to allow searching, indexing, and organizing of the desktop items.

In the depicted embodiment, the desktop manager 220 includes a time information collector 202, a desktop view generator 204, a GUI engine 206, and a labeling manager 210. The time information collector 202 is communicatively coupled to the data stores 140 and 150. The time information collector 202 is configured to collect time-based information about the local data objects 142 (and/or the remote data objects 162). The time information collector 202 stores the collected time-based information 152 into the data store 150. In one embodiment, the time information collector 202 uses Tracker, which may include an indexer, a search tool, and command line tools. The indexer is a lightweight daemon that extracts information from data objects (e.g., trackerd) and stores the extracted information in an index. The tracker search tool may provide a GUI object that allows the user to search the indexed data. The command line tools can be used for searching, querying the daemon status, and can be used for tagging desktop items (or the data objects themselves) as described in more detail below. A tag, which is a textual label, can be assigned to any data object to help organize and remember the data object. Tags may be a one-word label, or can be freeform text that allows multi-word labels. Tags can be tracked like other metadata, which can be extracted from within the data object. Tags may be chosen by the user, may be automatically assigned, or may be automatically supplied as default tags. A user can assign as many tags to a data object as desired and rename or delete the tags later. The time information collector 202 can monitor applications, disk access requests, etc, to keep up-to-date information about the data objects associated with the host computing system 102. During monitoring, the time information collector 202 extracts time-based information about these data objects, such as when was the data object created, when was it last modified or saved, when was it last accessed, how frequent the data object has been accessed, or other metadata about each of the data objects. The time information collector 202 can create an index of the data objects and store the metadata, including the time-based information 152 about those local data objects 142 stored in the data store 140 and/or remote data objects 162 in the remote data storage 160.

In one embodiment, the desktop view generator 204 accesses the time-based information 152, such as the index created by the time information collector, to generate desktop views. In one embodiment, the desktop view generator 204 generates a link for each of the desktop items to be displayed in the GUI; each link referring to one of the data objects stored in the local or remote storage. In other embodiments, the desktop view generator 204 may generate a desktop view that includes symbolic links for both local data objects 142 and remote data objects 162 regardless of the storage locations of the local data objects 142 and the remote data objects 162. The symbolic links may be an icon, a thumbnail, a shortcut, an alias, a Uniform Resource Locator (URL), a Uniform Resource Identifier (URI) or other types of symbolic links as would be appreciated by one of ordinary skill in the art having the benefit of this disclosure. Symbolic links are a special type of file that contains a reference to another file, a data object, or a directory in the form of an absolute or relative path. A symbolic link merely contains a text string that is interpreted and followed by the operating system as a path to another file, data object, or directory. The symbolic link can be a file on its own or a data object and can exist independently of its target. Symbolic links operates transparently for most operations: programs that read or write to files named by a symbolic link will behave as if operating directly on the target file. However, some programs that need to handle the symbolic link specially may identify and manipulate them directly. An icon, also referred to as a computer icon, is small pictogram used in GUIs to supplement the presentation of textual information to the user. A thumbnail is a small visual representation of the contents of the respective data object, as would be shown in a display. A shortcut is a small file containing a target UIR or GUID, the name of a target program file that the shortcut represents, or a target file, a target data object, or a target directory. The shortcut may also have additional parameter information that can be passed to the target program, data object, or file when it is selected. For example, Microsoft Windows operating systems use .lnk as the filename extension for shortcuts to local files and .URL for shortcuts to remote files, web pages, or other remote resources. Generally, double-clicking a shortcut is intended to be the same as double-clicking the application or file to which it refers. Some Unix based operating system may use .desktop files to point to local or remote files, folders, and applications. Mac-based operating systems may use aliases as symbolic links that point to local or remote files, folders, and applications. A URI is a string of characters used to identify a name or a resource on the Internet. A URL is a URI that specifies where an identified resource is available and the mechanism for retrieving it.

In one embodiment, the desktop view generator 204 can create a time-ordered desktop view of desktop items based on the time-based information 152. For example, the desktop view generator 204 generates a time-ordered desktop view of desktop items that shows desktop items for multiple subcategories, such as a desktop of currently opened documents, a desktop of today, a desktop of tomorrow, a desktop of by the end of the week, a desktop of this week, and a desktop of last week.

In the depicted embodiment, the GUI engine 206, which is communicatively coupled to the desktop view generator 204, generates a GUI on the display 170. The GUI may be a desktop view itself or may include a link to open a desktop view. The GUI engine 206 presents at least a portion of the time-ordered desktop view of desktop items in the GUI.

Figure 6:
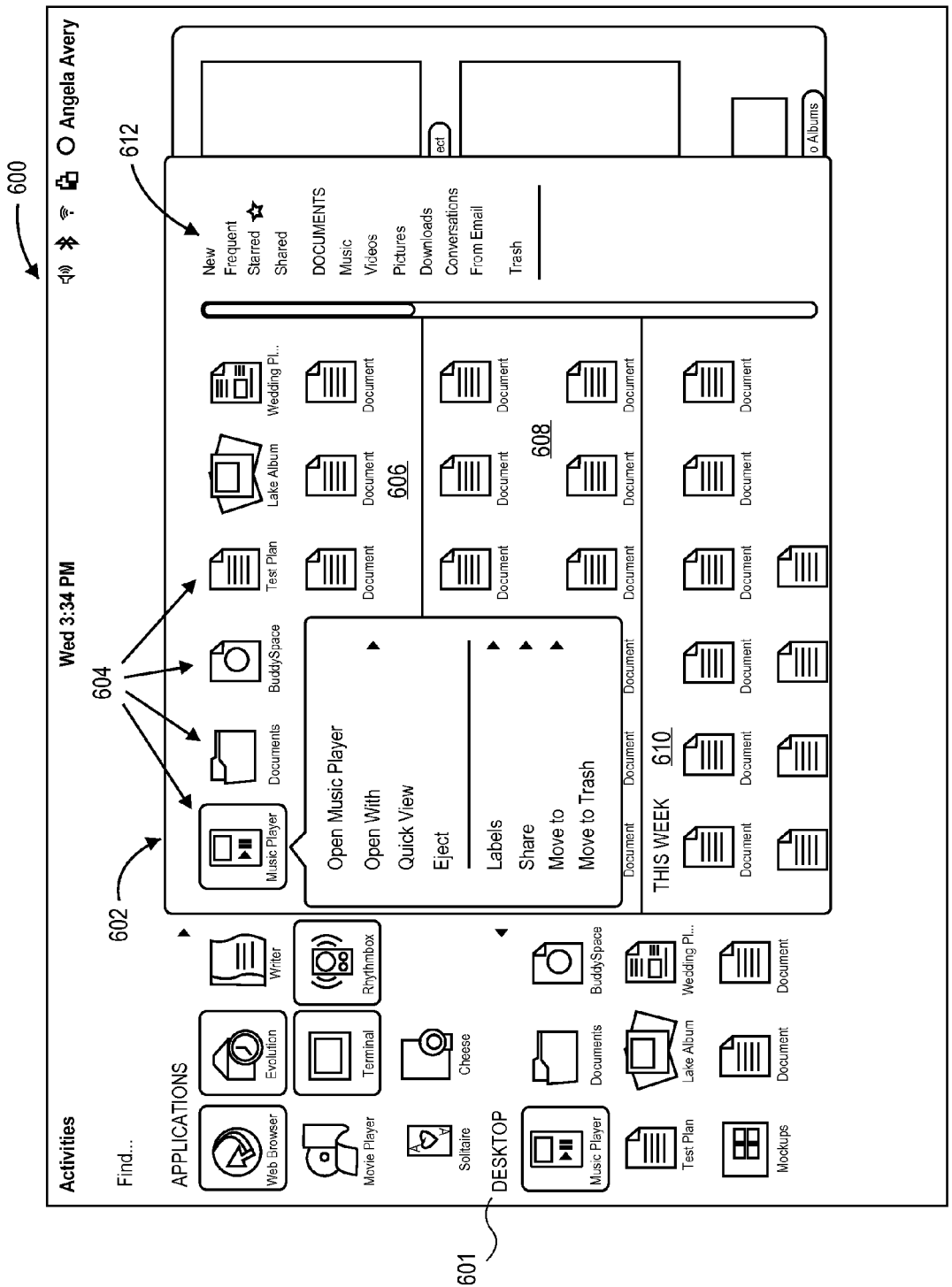
FIG. 6 illustrates an exemplary GUI, including a desktop view, according to one embodiment.

In one embodiment, the desktop view generator 204 generates a time-ordered desktop view, and the GUI engine 206 presents the GUI having time-ordered desktop view, such as the desktop view 602 illustrated in FIG. 6. In another embodiment, the desktop view generator 204 generates a desktop view that is not necessarily organized according to the time-based information 152, and the GUI engine 206 presents the desktop view in the display 170.

In one embodiment, the time information collector 202 collects time-based information for the local data objects 142 stored in a first database and remote data objects 162 stored in a second database (or multiple remote databases). The first database may be a files system of the host computing system 102, while the second database may be a remote database that stores remote data objects 162 for the host computing system 102. As described above, the remote data objects 162 may be stored in the remote data storage 160, or at the remote computing system 130. The time information collector 202 may collect information about the remote data objects 162 over the network 103 via the network interface 208.

In another embodiment, the desktop manager 220 includes the labeling manager 210. The labeling manager 210 is configured to receive user input from the user via the user interface 180 to filter the desktop items according to the labels (also referred to as tags). In one embodiment, the desktop view generator 204 generates the desktop view (time-ordered or not), and the labeling manager 210 filters the desktop view according to a set of one or more defined labels. The labels may be a set of default labels, a set of user-defined labels, or a combination of both. The set of labels may include at least one of a new label, a frequently-used label, an important label, a shared label, a document label, a picture label, a music label, a video label, a webpage label, an email label, a conversation label, a downloads label, a to-do label, or a follow-up label. Alternatively, the set of labels may be other labels as would be appreciated by one of ordinary skill in the art having the benefit of this disclosure. The user interface 180 may be integrated with the display 170 or may be separate. For example, as the user selects an existing label in the desktop view, the labeling manager 210 receives user input via the user interface 180. The user input may instruct the labeling manager 210 to filter the desktop view, generated by the desktop view generator 204. The GUI engine 206 can update the desktop view in the GUI on the display 170 as would be appreciated by one of ordinary skill in the art having the benefit of this disclosure.

In one embodiment, the time information collector 202 collects time-based information 152 and label information about the data objects, and stores the time-based information 152 and the label information in the data store 150. The label information includes zero or more labels assigned to each of the data objects. In another embodiment, the labeling manager 210 is configured to collect the label information, instead of the time information collector 202. The label information may be stored in the index containing the time-based information 152 or may be stored in its own index. Exemplary labels are illustrated in the exemplary desktop view 602, illustrated in FIG. 6, including new, frequent, starred, shared, documents, music, videos, pictures, downloads, conversations, from email, and trash. Alternatively, other labels may be used for the default labels or for user-defined labels.

The labeling manager 210 can receive user input to define the set of labels, to modify the set of labels, to add new labels, and to manually assign labels to desktop items. In another embodiment, the labeling manager 210 is configured to scan the data objects (local or remote data objects) or metadata associated with those data objects to automatically determine and assign appropriate labels to the desktop items without user interaction or with minimal user interaction. For example, the labeling manager 210 may be configured to automatically assign a document label to files with previously identified file extension types (e.g., .odt, .doc, .docx, .xls, etc). Similarly, the labeling manager 210 may automatically assign music, video, pictures, emails, conversations, or the like based on the file extensions. The labeling manager 210 may also be configured to automatically assign a download label to any item that is downloaded via, for example, a web browser or a FTP application. The labeling manager 210 may automatically assign other labels based on the filenames, the file extensions, content within the files, metadata associated with the files, the time-based information 152, as well as other information associated with a data object as would be appreciated by one of ordinary skill in the art having the benefit of this disclosure.

In one embodiment, the labeling manager 210 is configured to receive user input to perform operations on desktop items, such as to add a star designation, add an existing label, add a new label, or even add a note to at least one of the desktop items. For the add star designation, the labeling manager 210 adds a star label to one or more selected desktop items. The starred item denotes a meaning a user assigns to that star designation, but could be a relative importance of the desktop item. For example, the desktop view may include all desktop items for today, but the starred items could be listed first with a star designation, identifying those data objects as having a greater relative importance than other desktop items in the current desktop view. For the "add existing label" operation, the labeling manager 210 assigns the existing label to the selected desktop item. The labeling manager 210 can also re-filter the desktop view after the operation. For the "add new label" operation, the labeling manager 210 creates the new label, and then assigns the new label to the selected desktop items. The labeling manager 210 can add the new label to set of existing labels, and can re-filter the desktop view according to the updated set of labels. For the "add note" operation, the labeling manager 210 adds a note to the selected desktop item by storing the note to the selected one or more desktop items in the data store, such as part of the index of the time-based information 152, or as part of the labeling information stored in the data store 150.

The desktop manager 220 operates to combine desktop, search, places, and recently-used lists into one view that may dynamically change over time. The desktop view can be used as a place to stage items that need to be addressed. The desktop manager 220 can be used to allow desktop items to expire from the desktop after some time and fall safely into a time-ordered list, and eventually into an archive as described in more detail in FIG. 3. The places may be achieved by a default set of labels or tags that can be used as filters in the desktop view, as described herein. The desktop manager 220 can also provide enough abstraction from the underlying file system that the desktop manager 220 could transparently include non-local resources (e.g., remote data objects) in the same view as local resources (e.g., local data objects). The desktop manager 220 may also provide enough abstraction to include information that is not file-like, for example, the desktop manager 220 may display an instant message conversation or other data objects that are not file-like. The desktop manager 220 may also allow the user to schedule items to be addressed in the future directly within the desktop view. In one embodiment, the desktop manager 220 can stack similar or related desktop items so that they do not clutter the desktop view. The desktop manager 220 may also allow a user to access their desktop from the host computing system 102, as well as from other remote locations, such as from a second computing system over the network (eg., the remote computing system 130 via the network 103). The desktop manager 220 may also present a desktop view that is not hidden behind all of the user's activities on the host computing system 102. The desktop manager 220 may also allow a user to easily share desktop items with others, and allows everything in the archive to be readily searchable and have rich contextual metadata. The desktop manager 220 may also allow a user to add almost any kind of item as a desktop item. As described herein, the desktop manager 200 may allow the user to tag, star, and make other notes about content directly from the desktop view.

FIG. 3 is a block diagram of the desktop manager 320, including a backup manager 310, according to another embodiment. Some components of the desktop manager 320 are similar to components of the desktop manager 220 of FIG. 2 as noted by similar reference numbers. The desktop manager 320 includes the backup manager 310, the time information collector 202, a desktop view manager 304, and the GUI engine 206. The time information collector 202 collects time-based information 152 and stores the time-based information 152 in the local data store 340, the desktop view generator 304 generates a desktop view of desktop items to be displayed in a GUI, and the GUI engine 206 presents the GUI in the display 170. As described above, the desktop manager 320 can be used to allow desktop items to expire from the desktop view after some time and fall safely into a time-ordered list, and eventually into an archive. In order to archive desktop items, the desktop manager 320 includes the backup manager 310. The backup manager 310 is communicatively coupled to the local data store 340, as well as the network interface 208, and is configured to determine whether to back up one or more of the desktop items using the time-based information 152. For example, the user may set that desktop items are to be archived after desktop items have not been accessed for a month. When this condition is met, the backup manager 310 initiates the automatic backup of these desktop items. When the backup manager 310 determines that the desktop items need to be backed up, the backup manager 310 automatically backs up the desktop items in remote data storage 150 via the network interface 208. Of course, other conditions may be specified for determining how to automatically backup the desktop items. These conditions may be configurable by the user. In one embodiment, a backup agent 332 can be installed and executed on the remote computing system 330 to help the backup manager 310 back up the data objects in a remote data storage 360 of the remote computing system 330.

In one embodiment, the desktop view manager 304 is configured to generate a symbolic link for each of the desktop items to be displayed in the GUI. The symbolic links each include a path to a storage location where the respective data object is stored in the local data store 340. The backup manager 310 is configured to modify the symbolic link for each of the one or more desktop items being automatically backed up. Each of the modified symbolic links includes a path to a storage location in the remote data storage 150.

In another embodiment, the backup manager 310 mirrors a local copy and a remote copy of each of the desktop items, the local copies (e.g., local data objects 352) being stored in the local data store 350 and the remote copies (e.g., remote data objects 362) being stored in the remote data storage 360. In computing, a mirror is an exact copy of a data set, and can be used as a type of data synchronization. For example, a change to a local copy of the local data object 352 would automatically update the remote copy, i.e., the corresponding remote data object 362. In another embodiment, the backup manager 310 mirrors the local and remote copies for a specified period of time, and, after the specified period, the backup manager 310 deletes the local copies of the desktop items. By automatically backing up the desktop items, the user does not have to initiate backup of the local data objects, since the backup manager 310 does it automatically and transparently to the user. The backup manager 310 can be configured to continually backup desktop items or can be scheduled to backup desktop items in batches at a specified time and at specified time intervals, as configured by the user.

Figure 4A:
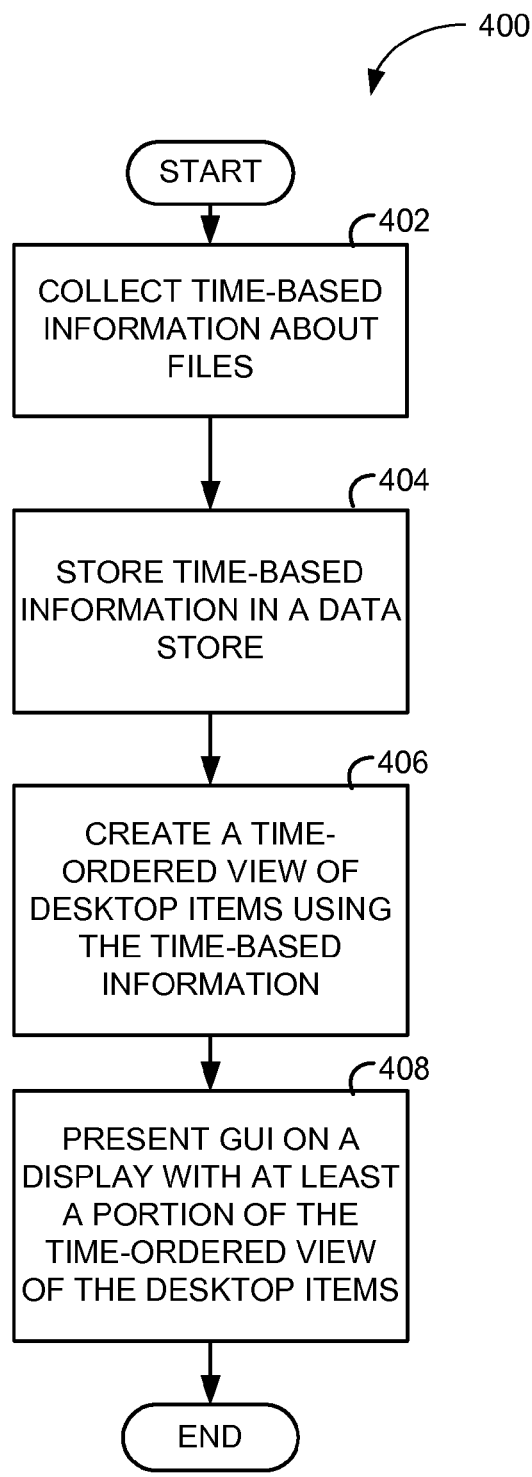
FIG. 4A is a flow diagram of one embodiment of a method of creating and presenting a time-ordered desktop view of desktop items.

FIG. 4A is a flow diagram of one embodiment of a method 400 of creating and presenting a time-ordered desktop view of desktop items. The method 400 is performed by processing logic that may comprise hardware (circuitry, dedicated logic, etc.), software (such as is run on a general purpose computing system or a dedicated machine), firmware (embedded software), or any combination thereof. In one embodiment, the desktop manager 120 of FIG. 1 performs the method 400. In another embodiment, the desktop manager 220 of FIG. 2 performs the method 400. Alternatively, other components of the host computing system 102 can perform some or all of the operations of method 400.

Referring to FIG. 4A, processing logic begins collecting time-based information about data objects (e.g., local data objects 142 and/or remote data objects 162) (block 402), and stores the time-based information in a data store (e.g., data store 150) (block 404). Using the time-based information stored in the data store, the processing logic creates a time-ordered desktop view of desktop items from the data objects (block 406). Next, the processing logic presents a GUI on a display (e.g., 170), displaying at least a portion of the time-ordered desktop view of the desktop items (block 408), and the method 400 ends.

In another embodiment of the method 400, the local data objects are stored in a file directory of a file system, and the processing logic creates the time-ordered desktop view by organizing the plurality of desktop items according to the time-based information regardless of storage locations of the desktop items in the file directory. In another embodiment, the data objects are both local data objects (e.g., 142) and remote data objects (e.g., 152, 162), and the local data objects are stored in a file directory of a file system and at least one data object is stored remotely, such as in a remote data storage or remote server. The processing logic creates the time-ordered desktop view by organizing the desktop items according to the time-based information regardless of storage locations of the local data objects and the at least one remote data object that is stored remotely.

In one embodiment of the method, the time-based information about each of the data objects includes at least one of a creation timestamp, a last-accessed timestamp, a last-modified timestamp, a calendar event, a reminder event, or a follow-up date. Alternatively, the time-based information may be other information about the data objects, such as a reminder data, due date data, to-do data, to-read data, reoccurring event data, or record or history data associated with the respective data objects. In another embodiment, the time-based information about each of the data objects includes a time-based type of action to be performed on the respective data object, the time-based type of actions including a future action, a current action, and a past action. In this embodiment, the processing logic organizing the desktop items according to the time-based type of actions and presents the organized time-ordered desktop view in the GUI.

In another embodiment, the processing logic organizes the desktop items in the time-ordered desktop view into one or more sub-categories. The one or more sub-categories may include a current desktop, a desktop of today, a desktop of last week, a desktop of tomorrow, a desktop of by end of week, or a desktop of any specified period. The processing logic presents the time-ordered desktop view that has been organized into the sub-categories in the GUI. The processing logic may receive user input to create, modify, or manage the time-ordered desktop view. For example, the processing logic may receive user input to customize the time-ordered desktop view, including which of the one or more sub-categories to display in the GUI and/or the order of the sub-categories. In another embodiment, the processing logic can present the time-ordered desktop view in a list view, a thumbnail view, an icon view, a menu view, or in other views as would be appreciated by one of ordinary skill in the art having the benefit of this disclosure. The processing logic can present the time-ordered desktop view in at least one of a file browser, a web browser, a viewing area of an application executing on the computing system, or in a working area (main view) of the computing system's display.

In one embodiment of the method at block 408, the processing logic generates a symbolic link for each of the desktop items to be displayed, where each link includes a path to a storage location where the respective data object is stored. The symbolic link may be at least one of an icon, a thumbnail, a shortcut, an alias, a Uniform Resource Locator (URL), or a Uniform Resource Identifier (URI), or other types of symbolic links as would be appreciated by one of ordinary skill in the art having the benefit of this disclosure. In one embodiment, the path is the local path to the storage location of the data object within the computing system. In one embodiment, the path is a local path to the storage location of the data object within a file directory of a file system when the operating system uses the file system. In another embodiment, the path is a network path to the storage location of the data object when the data object is stored remotely from the computing system.

Figure 4B:
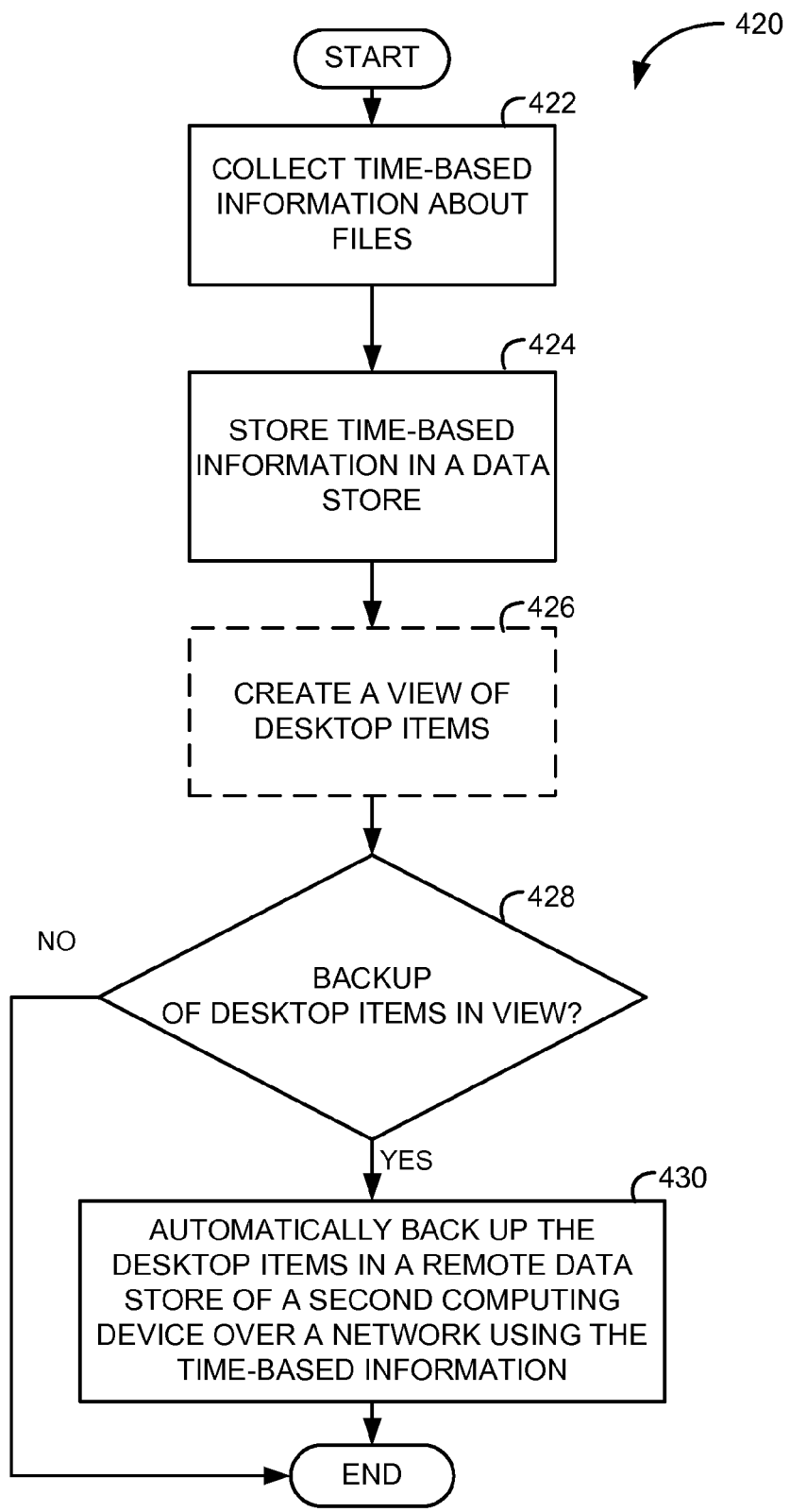
FIG. 4B is a flow diagram of one embodiment of a method of automatically backing up desktop items.

FIG. 4B is a flow diagram of one embodiment of a method 420 of automatically backing up desktop items. The method 420 is performed by processing logic that may comprise hardware (circuitry, dedicated logic, etc.), software (such as is run on a general purpose computing system or a dedicated machine), firmware (embedded software), or any combination thereof. In one embodiment, the desktop manager 120 of FIG. 1 performs the method 420. In another embodiment, the desktop manager 320 of FIG. 3 performs the method 420. Alternatively, other components of the host computing system 102 can perform some or all of the operations of method 420.

Referring to FIG. 4B, processing logic begins with collecting time-based information about local data objects stored in a local data store (e.g., data store 140) of the computing system (block 422), and stores the time-based information in a data store (e.g., data store 150) (block 424). Next, the processing logic creates a desktop view of desktop items from the data objects (block 406). Next, the processing logic determines whether to back up one or more of the desktop times using the time-based information (block 428). If at block 428, the processing logic determines to back up desktop items, the processing logic automatically backs up the one or more desktop items in a remote data store (e.g., 150 and/or 160) over a network (e.g., 103) (block 430); otherwise, the method 420 ends.

In another embodiment, the processing logic presents a GUI on a display (e.g., 170), displaying at least a portion of the time-ordered desktop view of the desktop items. The processing logic generates a symbolic link for each of the desktop items to be displayed in the GUI, where each symbolic link represents a path to a storage location where the respective data object is stored in the local data store. In this embodiment at block 430, the processing logic modifies the symbolic link for each of the one or more desktop items determined for automatic backup. The modified symbolic link then includes a path to a storage location in the remote data store. As described above, the symbolic link may be at least one of an icon, a thumbnail, a shortcut, an alias, a URL, or a URI, or other types of symbolic links as would be appreciated by one of ordinary skill in the art having the benefit of this disclosure.

As described above, the processing logic may receive user input to create, modify, or manage the created view. For example, the processing logic may receive user input to customize the desktop view, such as what desktop items to display, which sub-categories to include in the desktop view, the order of the sub-categories, or the like. In another embodiment, the processing logic can present the desktop view in a list view, a thumbnail view, an icon view, a menu view, or in other views as would be appreciated by one of ordinary skill in the art having the benefit of this disclosure. The processing logic can present the desktop view in at least one of a file browser, a web browser, a viewing area of an application executing on the computing system, or a working area (main view) of the computing system's display.

In one embodiment at block 430, the processing logic automatically backs up the data objects by mirroring a local copy and a remote copy of each of the one or more desktop items to be backed up. The local copies are stored in the local data store and the remote copies are stored in the remote date store. In another embodiment at block 430, the processing logic automatically backs up the data objects by mirroring local copy and a remote copy of each of the one or more of the desktop items for a specified period. After the specified period, the processing logic deletes the local copies of the one or more of the desktop items.

Figure 4C:
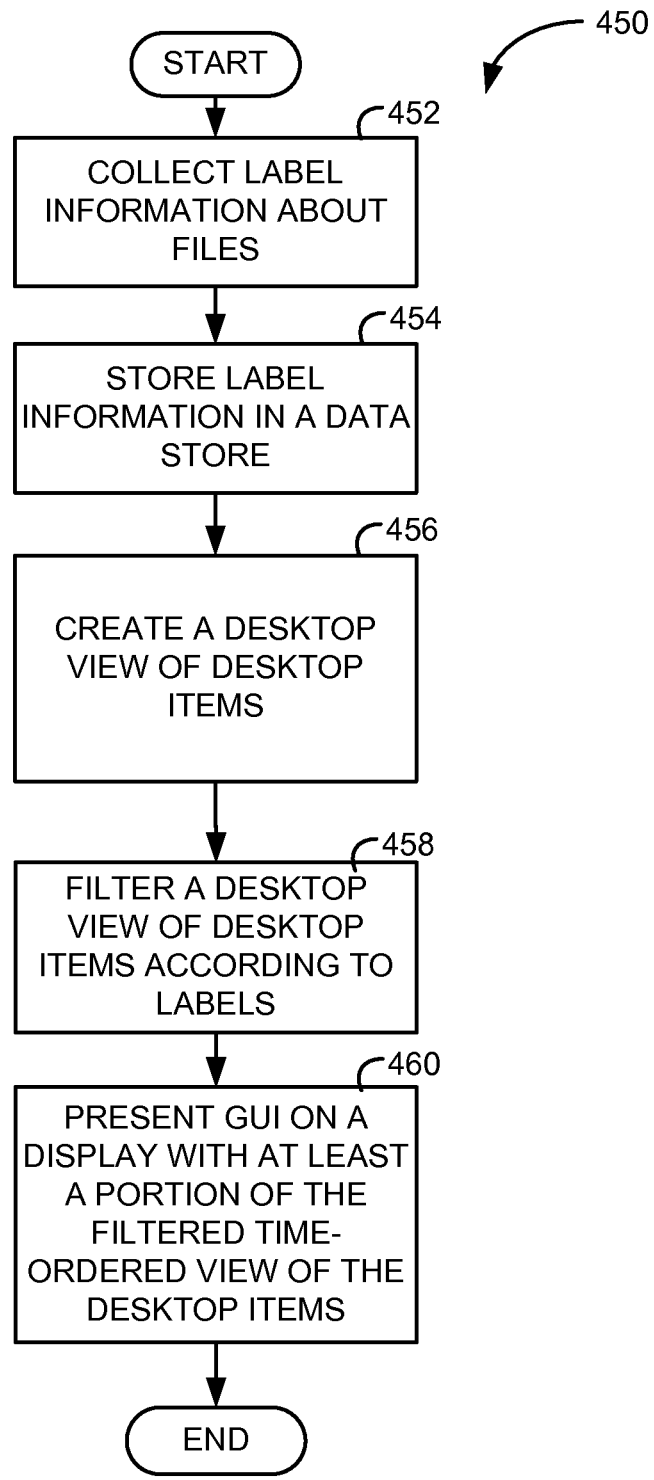
FIG. 4C is a flow diagram of one embodiment of a method of filtering the time-ordered desktop view according to labels of the desktop items.

FIG. 4C is a flow diagram of one embodiment of a method 450 of filtering the time-ordered desktop view according to labels of the desktop items. The method 450 is performed by processing logic that may comprise hardware (circuitry, dedicated logic, etc.), software (such as is run on a general purpose computing system or a dedicated machine), firmware (embedded software), or any combination thereof. In one embodiment, the desktop manager 120 of FIG. 1 performs the method 450. In another embodiment, the desktop manager 220 of FIG. 2 performs the method 450. Alternatively, other components of the host computing system 102 can perform some or all of the operations of method 450.

Referring to FIG. 4C, processing logic begins collecting time-based information about data objects (e.g., local data objects 142 and/or remote data objects 162) (block 452), stores the time-based information in a data store (e.g., data store 150) (block 454). The processing logic also maintains label information in the data store (block 456). The label information includes zero or more labels assigned to each of the data objects. The labels may be a set of default labels, a set of user-defined labels, or a combination of both as described above. Using the time-based information stored in the data store (e.g., data store 150), the processing logic creates a time-ordered desktop view of desktop items from the data objects (block 458). Next, the processing logic filters the time-ordered desktop view of desktop items according to labels using the label information (block 460), and presents a GUI on a display (e.g., 170), displaying at least a portion of the filtered, time-ordered desktop view of the desktop items (block 462); and the method 450 ends. For example, the user may be viewing the time-ordered list of desktop items and then click on one of the default or user-defined labels, and the processing logic can present a filtered view of the desktop items that have that label. Alternatively, the labels may be used for other filter scenarios as would be appreciated by one of ordinary skill in the art having the benefit of this disclosure.

In another embodiment of the method 450, the processing logic receives user input to define a new user-defined label. The processing logic creates the new user-defined label, and updates the set of existing labels to include the new user-defined label. The processing logic can then re-filter the time-ordered desktop view according to the updated set of labels.

In one embodiment, the processing logic at block 460 filters the time-ordered desktop view by determining a label, if any, assigned to each of the desktop items of the time-ordered desktop view, and organizes each of the desktop items into one or more sub-categories according to the assigned labels. The processing logic then presents the GUI with the filtered, time-ordered desktop view of the desktop items. In this embodiment, the sub-categories correspond to the labels, which may be default labels or user-defined labels as described above. In a further embodiment, the processing logic assigns a label to each of the desktop items that has no label designation based on either the time-based information or other metadata of the respective data object.

As noted above, the processing logic can automatically assign labels to the desktop items when no label designation has been given. Alternatively, the processing logic can assign labels according to user input received from the user as described in more detail below with respect to FIG. 4D.

Figure 4D:
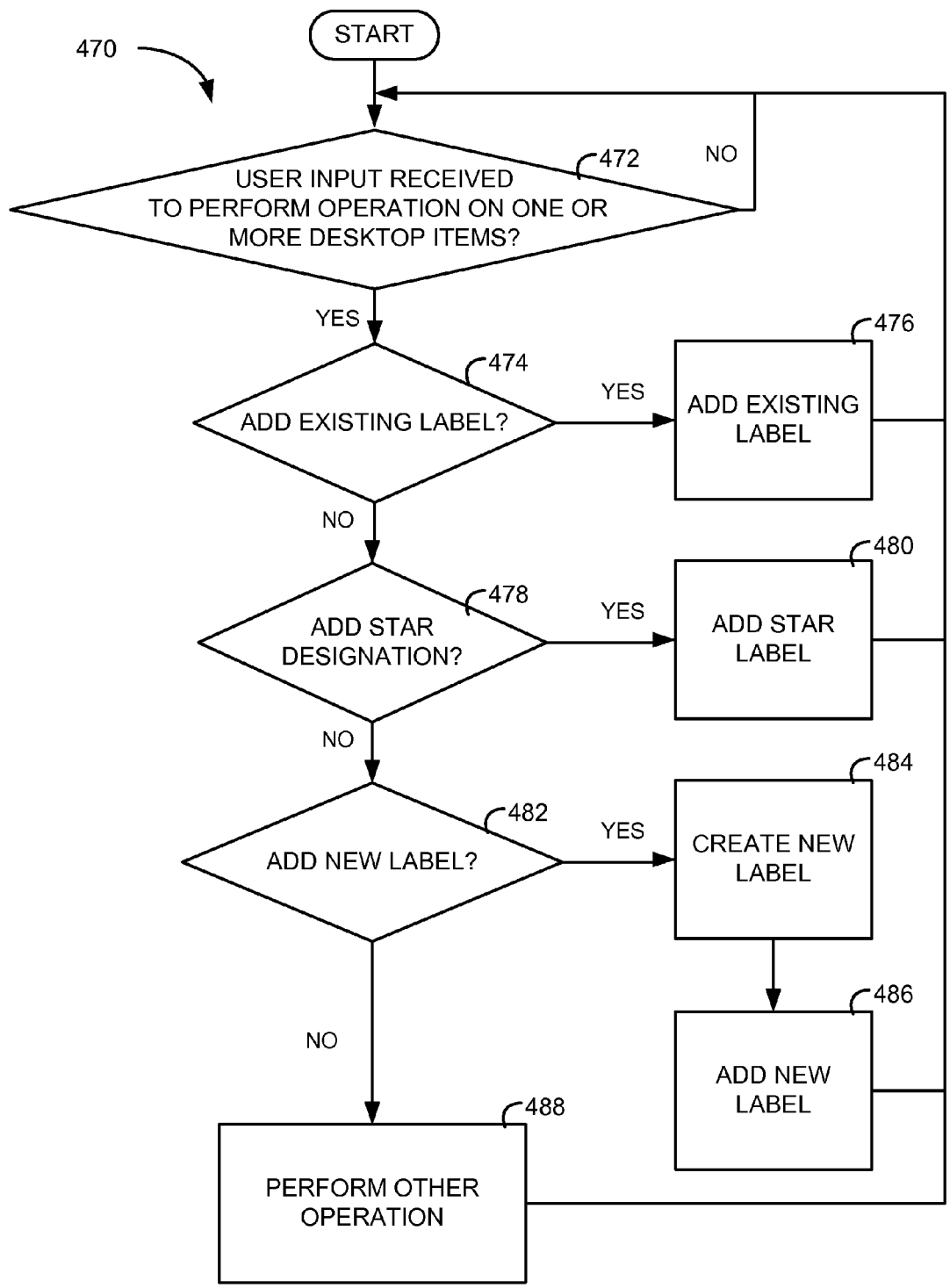
FIG. 4D is a flow diagram of one embodiment of a method of assigning labels to desktop items.

FIG. 4D is a flow diagram of one embodiment of a method 470 of assigning labels to desktop items. The method 470 is performed by processing logic that may comprise hardware (circuitry, dedicated logic, etc.), software (such as is run on a general purpose computing system or a dedicated machine), firmware (embedded software), or any combination thereof. In one embodiment, the desktop manager 120 of FIG. 1 performs the method 450. In another embodiment, the desktop manager 220 of FIG. 2 performs the method 470. Alternatively, other components of the host computing system 102 can perform some or all of the operations of method 470.

Referring to FIG. 4D, processing logic begins with receiving user input to perform an operation on one or more desktop items (block 427). In one embodiment, the processing logic receives the user input directly from the desktop view (e.g., a window in the GUI) displaying the time-ordered desktop view of desktop items. Alternatively, the user input may be received via other user interfaces than the desktop view of the GUI. At block 474, the processing logic determines if the operation is to add an existing label to the one or more desktop items. If so, the processing logic adds the existing label to the one or more desktop items (block 476), and returns to block 472 to determine if additional user input is received. At block 478, the processing logic determines if the operation is to add a star designation to the one or more desktop items. If so, the processing logic adds a star label to the one or more desktop items (block 480), and returns to block 472 to determine if additional user input is received. A desktop item can be designated as a starred desktop item to denote any meaning a user assigns to the designation, but often reflects the importance of the desktop item over other desktop items. The star label can be one of the labels, but can be handled separate from the other labels. For example, a desktop item may be given the document label, as well as being a starred desktop item. At block 482, the processing logic determines if the operation is to add a new label to the one or more desktop items. If so, the processing logic creates a new label to the set of existing labels (block 484), and adds the new label to the one or more desktop items (block 486), and returns to block 472 to determine if additional user input is received. If the processing logic determines that none of these operations are to be performed, the processing logic may perform another operation that may be related or un-related to labels (block 488). For example, the user input may be input received in a search utility on the desktop to search keywords within the desktop items. The user input may also be used to search for existing labels or the like. It should be noted that other operations may be performed in connection with the labels as would be appreciated by one of ordinary skill in the art having the benefit of this disclosure.

In another embodiment, upon return to block 472 from blocks 476, 480, 486, and 488, the processing logic can re-filter the time-ordered list to update the desktop view of the time-ordered desktop view in the GUI. For example, when a new label is created, the processing logic updates the set of labels to include the new user-defined label and then re-filters the time-ordered desktop view according to the updated set of labels.

In another embodiment, the processing logic receives user input to add a note to one or more of the desktop items. The processing logic adds the note to the one desktop item. For example, the note can be stored in an index entry associated with the desktop item as would be appreciated by one of ordinary skill in the art having the benefit of this disclosure.

Figure 5:
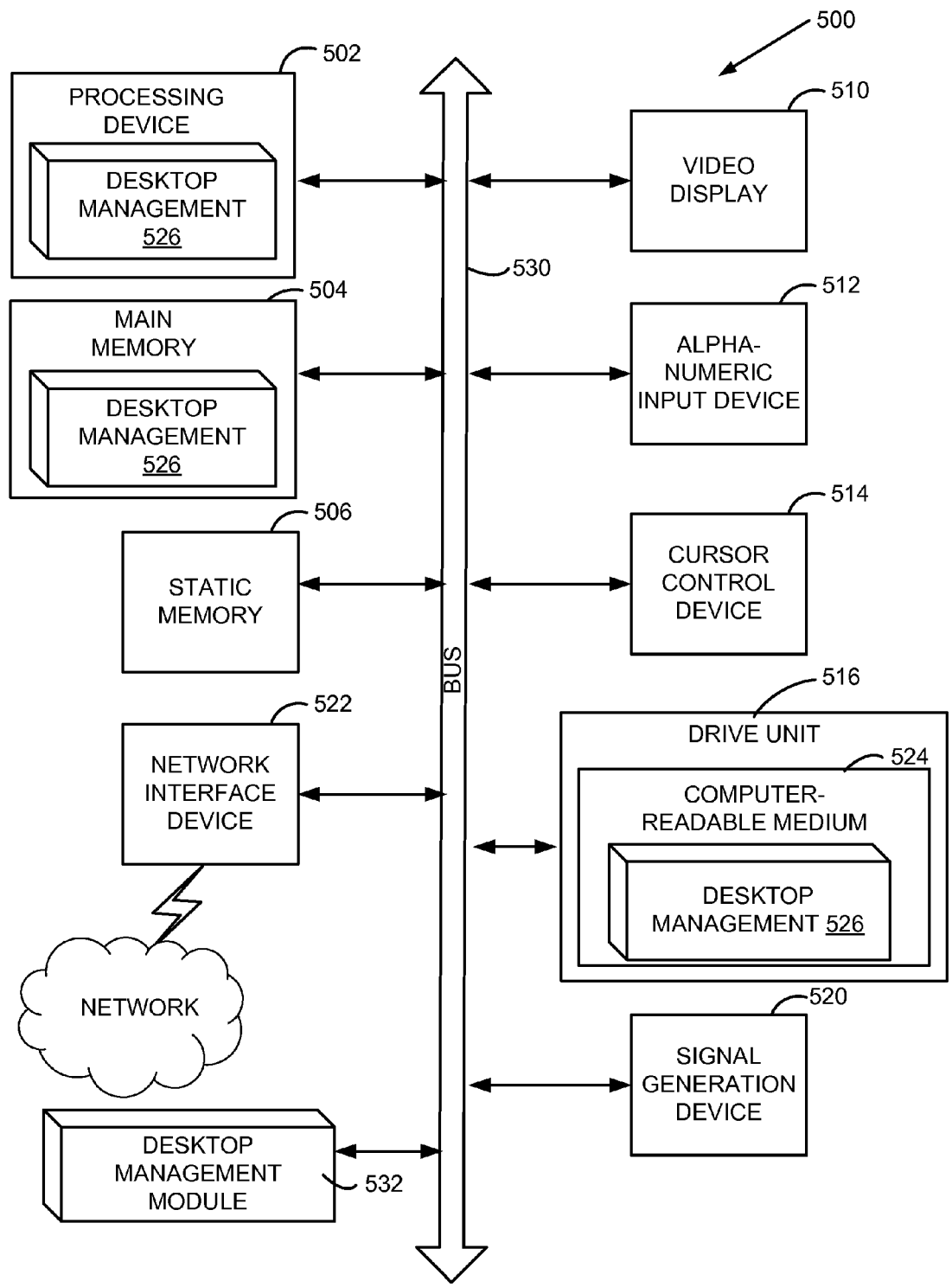
FIG. 5 illustrates a diagrammatic representation of a machine in the exemplary form of a computing system for desktop information management.

FIG. 5 illustrates a diagrammatic representation of a machine in the exemplary form of a computing system 500 for desktop information management. Within the computing system 500 is a set of instructions for causing the machine to perform any one or more of the methodologies discussed herein. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a PC, a tablet PC, a set-top-box (STB), a personal data assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein for desktop information management, such as the method 400, 420, 450, and 470 described above. In one embodiment, the computing system 500 represents various components that may be implemented in the host computing system 102 as described above. Alternatively, the host computing system 102 may include more or less components as illustrated in the computing system 500.

The exemplary computing system 500 includes a processing device 502, a main memory 504 (e.g., read-only memory (ROM), flash memory, dynamic random access memory (DRAM) such as synchronous DRAM (SDRAM), etc.), a static memory 506 (e.g., flash memory, static random access memory (SRAM), etc.), and a data storage device 516, each of which communicate with each other via a bus 530.

Processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute the processing logic (e.g., desktop information management 526) for performing the operations and steps discussed herein.

The computing system 500 may further include a network interface device 522. The computing system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The data storage device 516 may include a computer-readable storage medium 524 on which is stored one or more sets of instructions (e.g., desktop information management 526) embodying any one or more of the methodologies or functions described herein. The desktop information management 526 may also reside, completely or at least partially, within the main memory 504 and/or within the processing device 502 during execution thereof by the computing system 500, the main memory 504 and the processing device 502 also constituting computer-readable storage media. The desktop information management 526 may further be transmitted or received over a network via the network interface device 522.

While the computer-readable storage medium 524 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, or other types of mediums for storing the instructions. The term "computer-readable transmission medium" shall be taken to include any medium that is capable of transmitting a set of instructions for execution by the machine to cause the machine to perform any one or more of the methodologies of the present embodiments.

The desktop information management module 532, components, and other features described herein (for example in relation to FIGS. 1-3) can be implemented as discrete hardware components or integrated in the functionality of hardware components such as ASICS, FPGAs, DSPs, or similar devices. The desktop information management module 532 may implement operations of desktop information management as described herein with respect to FIGS. 4A-4D. In addition, the desktop information management module 532 can be implemented as firmware or functional circuitry within hardware devices. Further, the desktop information management module 532 can be implemented in any combination hardware devices and software components.

FIG. 6 illustrates an exemplary GUI 600, including a desktop view 602, according to one embodiment. The GUI 600 includes a working area (main view) with various symbolic links to applications, documents, folders, and other desktop items. In this embodiment, the main view or working area is an activities view that includes a link to applications, a select few applications (e.g., commonly-used applications), a desktop link 601, and a select few desktop items (e.g., currently opened desktop items). When the desktop link 601 is activated, the GUI 600 displays the desktop view 602 over the working area. For example, the desktop view 602 may be shown when the user clicks on the desktop link 601 on the GUI 600. The desktop view 602 may be semi-transparent, or may cover some or all of the working area. The desktop view 602 includes the time-ordered desktop view of desktop items, which is generated by the desktop view generator (204 or 304). In this embodiment, the desktop view 602 includes desktop items 604 that are currently open 606, desktop items of today 608, and desktop items of this week 610. This desktop view 602 may display all of the desktop items, or only a portion of the time-ordered desktop view, but additional desktop items may be lower in the desktop view 602. These additional desktop items can be accessed, for example, by the user scrolling down in the desktop view 602. The desktop items 604 may include applications, such as the media player application, files, folders, as well as other data objects. The desktop items 604 are represented as icons, but could also be other types of symbolic links as described herein. The desktop view 602 is a grid view of icons, but could be a list view, a menu view, a thumbnail view, or any combination thereof. In one embodiment, if desktop items 604 are not pinned into the desktop view 602, the desktop items 604 will gradually fall down in position of the desktop view 602 until they safely drop into a time-ordered list, and eventually into an archive, as described above with respect to the backup manager 310 of FIG. 3.

FIG. 6 also illustrates a set of labels 612 for the desktop view 602. The depicted labels include new, frequent, starred, shared, documents, music, videos, pictures, downloads, conversations, from email, and trash. These labels 612 may be default labels, user-defined labels, or a combination of both. Alternatively, other labels may be used for the default labels or for user-defined labels. The GUI 600 may also include other features, such as a find feature that allows the user to search for data objects, desktop items 604, and/or labels 612. The GUI 600 may also include another find feature that allows the user to search the desktop items directly in the desktop view 602 (not illustrated). Each desktop item 604 can be selected, for example, by left-clicking a mouse cursor over the respective icon. A user may also select additional options for a particular desktop item 604, for example, by right-clicking the mouse cursor over the respective icon. As shown in FIG. 6, the user may select various options from a menu that is displayed in response to the user right-clicking the desktop item 604. These options include an option to open the desktop item 604 (e.g., opening an application or a document), a selection option to select an application to use when opening the desktop item 604, an option to quick view the desktop item 604, an option to eject the desktop item 604, an option to add a label to the desktop item 604, an option to share the desktop item 604, an option to move the desktop item 604, and an option to move the desktop item 604 to the trash. Alternatively, other types of options can be provided, and more or less options can be provided than as shown in FIG. 6 as would be appreciated by one of ordinary skill in the art having the benefit of this disclosure.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to utilize the invention and various embodiments with various modifications as may be suited to the particular use contemplated.

What is claimed is:

1. A method comprising:
   extracting contextual information from a plurality of data objects, wherein the contextual information comprises a time-based information associated with an action on a respective one of the plurality of data objects, and a respective last-accessed timestamp for each of the plurality of data objects;
   assigning a label to at least one of the plurality of data objects, wherein the label is in view of the extracted contextual information;

tracking the labels of the at least one of the plurality of data objects;

associating each of a plurality of desktop items to a respective one of each of the plurality of data objects;

creating a time-ordered desktop view of each of the plurality of desktop items from the plurality of data objects in view of the contextual information;

organizing, by a processing device, the time-ordered desktop view in view of the labels, wherein the organizing comprising organizing the desktop items in view of the time-based information associated with the action on the respective one of the plurality of data objects;

determining that a respective data item is expired upon the last-accessed timestamp of the respective data object associated with the respective data item is prior to a time; and presenting a graphical user interface (GUI) on a display, the GUI displaying a portion of the time-ordered desktop view of the plurality of desktop items in view of the organizing, wherein the portion of the time-ordered desktop view of the plurality of desktop items does not include the expired desktop item.

2. The method of claim 1, wherein the plurality of data objects stored in a file directory of a file system of a computing system, and wherein said creating the time-ordered desktop view comprises organizing the plurality of desktop items according to the contextual information regardless of storage locations of the plurality of desktop items in the file directory.

3. The method of claim 1, wherein one of the plurality of data objects is stored in a file directory of a file system of a computing system and one of the plurality of data objects is stored remotely from the computing system, and wherein said creating the time-ordered desktop view comprises organizing the plurality of desktop items according to the contextual information regardless of storage locations of the data object stored in the file directory and the data object stored remotely.

4. The method of claim 1, further comprising storing the contextual information in a data store of a computing system.

5. The method of claim 1, wherein the time-based information about each of the plurality of data objects comprises at least one of a creation timestamp, a last-modified timestamp, a calendar event, a reminder event, or a follow-up date.

6. The method of claim 1, wherein the contextual information about each of the plurality of data objects comprises a time-based type of action to be performed on the respective one of the plurality of data objects, and wherein the time-based type of actions comprises a current action and a past action.

7. The method of claim 6, wherein said wherein said creating the time-ordered desktop view comprises organizing the plurality of desktop items according to the time-based type of actions, and wherein said presenting the GUI comprises presenting the time-ordered desktop view according to organized time-based type of actions.

8. The method of claim 1, wherein said creating the time-ordered desktop view comprises organizing the plurality of desktop items into one or more sub-categories, wherein the one or more sub-categories comprises at least one of a current desktop, a desktop of today, a desktop of this week, a desktop of last week, a desktop of tomorrow, or a desktop of by end of week, and wherein said presenting the GUI comprises presenting one or more of the sub-categories in the time-ordered desktop view.

9. The method of claim 8, further comprising receiving user input to customize the time-ordered desktop view.

10. The method of claim 1, wherein said presenting the GUI comprises generating a symbolic link for each of the plurality of desktop items to be displayed in the GUI, and wherein each of the symbolic links comprises a path to a storage location where the respective data object is stored.

11. The method of claim 10, wherein the symbolic links each comprise at least one of an icon, a thumbnail, a shortcut, an alias, a Uniform Resource Locator (URL), or a Uniform Resource Identifier (URI).

12. The method of claim 1, wherein said presenting comprising presenting the time-ordered desktop view in at least one of a list view, a thumbnail view, an icon view, or a menu view.

13. The method of claim 1, wherein said presenting comprising presenting the GUI in at least one of a file browser, a web browser, a viewing area of an application executing on a computing system, or a main view of the display.

14. The method of claim 1, wherein said presenting the GUI comprises generating a link for each of the plurality of desktop items to be displayed in the GUI, and wherein each of the links refers to one of the plurality of data objects stored in a computing system or stored remotely from the computing system.

15. A non-transitory computer readable storage medium comprising instructions that, when executed by a processing device, cause the processing device to:

extract contextual information from a plurality of data objects, wherein the contextual information and comprises a time-based information associated with an action on a respective one of the plurality of data objects, and a respective last-accessed timestamp for each of the plurality of data objects;

assign a label to at least one of the plurality of data objects, wherein the label is in view of the extracted contextual information;

track the labels of the at least one of the plurality of data objects;

associate each of a plurality of desktop items to a respective one of each of the plurality of data objects;

create a time-ordered desktop view of each of the plurality of desktop items from the plurality of data objects in view of the contextual information;

organize the time-ordered desktop view in view of the labels, wherein to organize, the processing device is to organize the desktop items in view of the time-based information associated with the action on the respective one of the plurality of data objects;

determine that a respective data item is expired upon the last-accessed timestamp of the respective data object associated with the respective data item is prior to a time; and present a graphical user interface (GUI) having a portion of the time-ordered desktop view of the plurality of desktop items in view of the organized time-ordered desktop view, wherein the portion of the time-ordered desktop view of the plurality of desktop items does not include the expired desktop item.

16. The non-transitory computer readable storage medium of claim 15, wherein the plurality of data objects are stored in a file directory of a file system of a computing system, and wherein said to create the time-ordered desktop view, the processing device is to organize the plurality of desktop items according to the contextual information regardless of storage locations of the plurality of desktop items in the file directory.

17. The non-transitory computer readable storage medium of claim 15, wherein one of the plurality of data objects is stored in a file directory of a file system of a computing system and one of the plurality of data objects is stored remotely from the computing system, and wherein said to create the time-ordered desktop view, the processing device is to organize the plurality of desktop items according to the contextual information regardless of storage locations of the data object stored in the file directory and the data object stored remotely.

18. The non-transitory computer readable storage medium of claim 15, wherein the processing device is further to store the contextual information in a data store of a computing system.

19. The non-transitory computer readable storage medium of claim 15, wherein the time-based information about each of the plurality of data objects comprises at least one of a creation timestamp, a last-modified timestamp, a calendar event, a reminder event, or a follow-up date.

20. The non-transitory computer readable storage medium of claim 15, wherein said to create the time-ordered desktop view, the processing device is to organize the plurality of desktop items into one or more sub-categories, wherein the one or more sub-categories comprises at least one of a current desktop, a desktop of today, a desktop of this week, a desktop of last week, a desktop of tomorrow, or a desktop of by end of week, and wherein said presenting the GUI comprises presenting one or more of the sub-categories in the time-ordered desktop view.

21. The non-transitory computer readable storage medium of claim 15, wherein the processing device is further to receive user input to customize the time-ordered desktop view.

22. A system, comprising:
  data storage to store contextual information about a plurality of data objects, wherein the contextual information is extracted from the plurality of data objects, wherein the contextual information comprises a time-based information associated with an action on a respective one of the plurality of data objects, and a respective last-accessed timestamp for each of the plurality of data objects; and
  a processing device operatively coupled to the data storage and, wherein the processing device executes a desktop manager to:
    associate each of a plurality of desktop items to a respective one of each of the plurality of data objects,
    assign a label to at least one of the plurality of data objects, wherein the label is in view of the extracted contextual information,
    track the labels of the at least one of the plurality of data objects;
    create a time-ordered desktop view of each of the plurality of desktop items from the plurality of data objects in view of the contextual information,
    organize the time-ordered desktop view in view of the labels, wherein to organize, the processing device is to organize the desktop items in view of the time-based information associated with the action on the respective one of the plurality of data objects,
    determine that a respective data item is expired upon the last-accessed timestamp of the respective data object associated with the respective data item is prior to a time, and
    present a graphical user interface (GUI) on a display, the GUI to display at least a portion of the time-ordered desktop view of the plurality of desktop items in view of the organized time-ordered desktop view, wherein the portion of the time-ordered desktop view of the plurality of desktop items does not include the expired desktop item.

23. The system of claim 22, wherein the desktop manager comprises:
  a time information collector communicatively coupled to the data storage and to extract the contextual information about the plurality of data objects and to store the contextual information in the data storage;
  a desktop view generator communicatively coupled to the data storage to create the time-ordered desktop view of the plurality of desktop items using the contextual information stored in the data storage; and
  a GUI engine communicatively coupled to the display and the desktop view generator to present the GUI on the display, the GUI to display a portion of the time-ordered desktop view generated by the desktop view generator.

24. The system of claim 22, wherein the contextual information is stored in a first database stored on the data storage, wherein one of the plurality of data objects is stored in a second database stored on the data storage, and wherein a time information collector is to access the second database to extract the contextual information about the one of the plurality of data objects stored in the second database.

25. The system of claim 22, wherein the contextual information is stored in a first database stored on the data storage, wherein one of the plurality of data objects is stored in a second database stored on a network remotely from a computing system, wherein the desktop manager further comprises a network interface to communicate with the second database over the network, and wherein a time information collector is to access the second database via the network interface to extract the contextual information about the one of the plurality of data objects stored in the second database.

26. The system of claim 22, wherein the plurality of data objects are stored in a file directory of a file system of a computing system.

* * * * *